Oct. 29, 1929.　　　　E. MAYER　　　　1,733,354
PHOTOMETER
Filed July 8, 1927　　　3 Sheets-Sheet 1
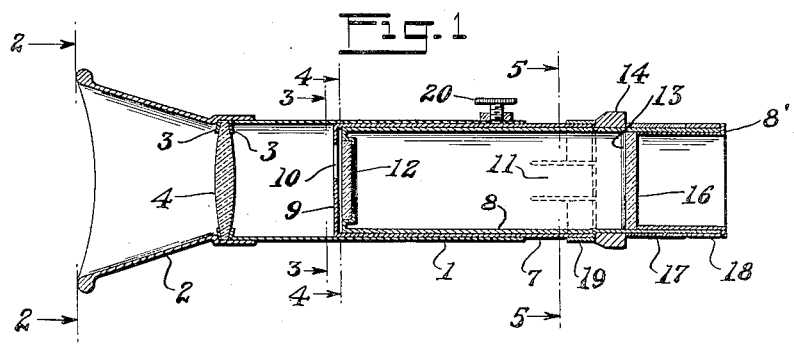
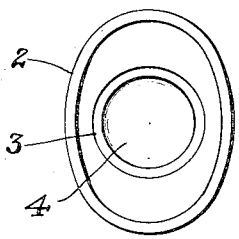
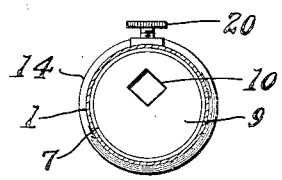
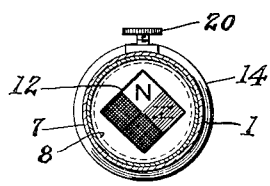
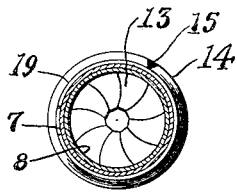
Emil Mayer
INVENTOR.
BY Mock & Blum
ATTORNEYS.

Oct. 29, 1929.   E. MAYER   1,733,354
PHOTOMETER
Filed July 8, 1927   3 Sheets-Sheet 2
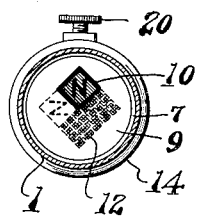
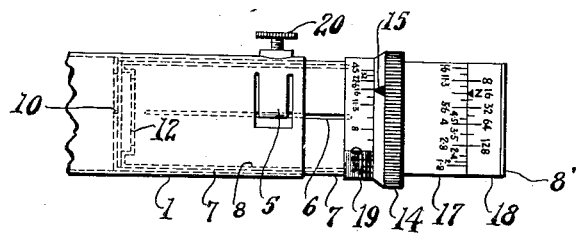
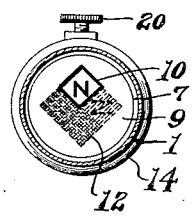
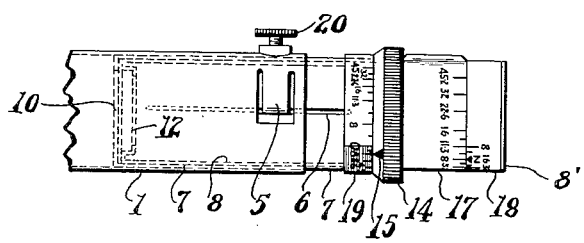
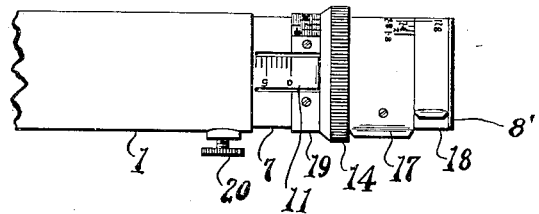
Emil Mayer INVENTOR.
BY Mock & Blum ATTORNEYS.

Oct. 29, 1929.  E. MAYER  1,733,354
PHOTOMETER
Filed July 8, 1927  3 Sheets-Sheet 3
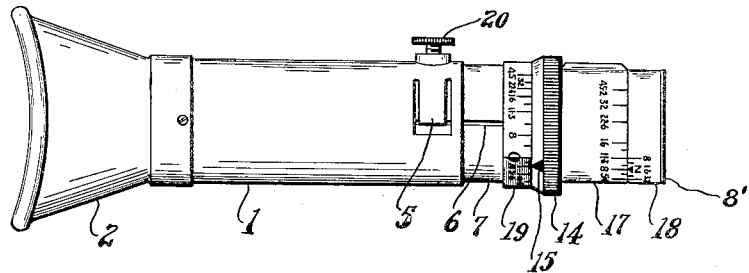
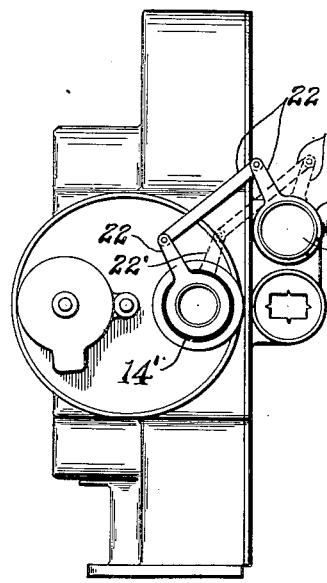
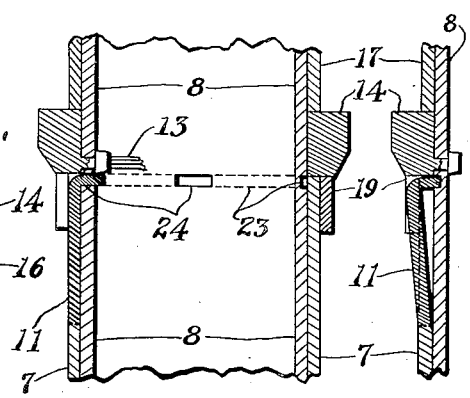
Emil Mayer INVENTOR.
BY Mock & Blum
ATTORNEYS.

Patented Oct. 29, 1929

1,733,354

UNITED STATES PATENT OFFICE

EMIL MAYER, OF VIENNA, AUSTRIA, ASSIGNOR TO DREM PRODUCTS CORPORATION, OF NEW YORK, N. Y., A CORPORATION OF NEW YORK

PHOTOMETER

Application filed July 8, 1927. Serial No. 204,180.

My invention relates to a new and improved photometer or optical device for measuring the intensity of light, such as an exposure meter, for example.

One of the objects of my invention is to provide improvements in the device shown in U. S. Patent No. 1,587,539 issued to me on June 8th, 1926.

Another object of my invention is to provide an exposure meter which will enable the user to readily and directly determine the proper lens aperture or diaphragm opening for motion picture cameras or any other photographic apparatus having a uniform shutter speed combined with means to mechanically compute the relative stop value corresponding to varying exposure or shutter speeds.

Another object of my invention is to improve photometers which contain devices for controlling the brightness of admitted light, such as iris diaphragms. This can be done, for example, by extending the full scale of stop values beyond an arc of 90° (and even up to 360°) and causing the indicating means or index associated with the iris diaphragm, to apply to any of several selective subdivisions of the scale, each subdivision occupying an arc of 90°.

Another object of my invention is to make the photometers usable for determination of high stop values, without change of present practical dimensions.

Another object of my invention is to connect an exposure meter containing an iris diaphragm or a similar device with still cameras or motion picture cameras so that the proper diaphragm setting of the camera is automatically secured by properly setting the diaphragm of the exposure meter.

Other objects of my invention will be set forth in the following description and drawings which illustrate a preferred embodiment of my invention, it being understood that the above general description of the objects of my invention is intended merely to generally explain the same and not to limit it in any manner.

Fig. 1 is a longitudinal section of the photometer.

Fig. 2 is an end view of the appliance looking in the direction of the arrows 2—2 of Fig. 1.

Fig. 3 is a cross-sectional view looking in the direction of the arrows 3—3 of Fig. 1, illustrating the masking disc and window opening therein.

Fig. 4 is a cross-sectional view looking in the direction of arrows 4—4 of Fig. 1, illustrating the system of translucent fields.

Fig. 5 is a cross-section looking in the direction of the arrows 5—5 of Fig. 1, schematically illustrating the device regulating the aperture.

Fig. 6 is a partial view of the photometer, illustrating a reading on a lower section of the relative stop values.

Fig. 7 is an end view of Fig. 6, showing the less translucent field in position. This field corresponds to the index range of Fig. 6.

Fig. 8 is a partial view of the photometer illustrating a reading on a higher section of the relative stop values.

Fig. 9 is an end view of Fig. 8, showing the more translucent field in position. This position corresponds to the index range of Fig. 8.

Fig. 10 is a partial view of the instrument showing the focusing scale and the spring member regulating the position of the translucent fields.

Fig. 11 is a complete view of the photometer showing the respective relation of the outside visible members.

Fig. 12 is a developed view of the plate bearing the scale of stop numbers.

Fig. 13 illustrates an application of the photometer to a photographic motion picture camera in which the diaphragm of the photometer and the camera are connected so that the position of the photometer's diaphragm is caused to automatically regulate the diaphragm of the camera lens.

Fig. 14 is an enlarged sectional detail, illustrating the spring member regulating the position of the translucent fields, one of these fields being shown in the operative position.

Fig. 15 illustrates the position of the spring member referred to in Fig. 14, while the fields are being transferred and while the spring member is sliding in the circumferential groove, between arresting notches.

The term "exposure speed" as applied to photographic lenses in use refers to the intensity of the action of the light on the sensitive material of the photographic plate or the like. The intensity of the light action depends upon two factors, namely, the volume of light passing through the lens, and the concentration or intensity of the light when it reaches the sensitive material. The first factor depends upon the area of the aperture of the diaphragm which is ordinarily used with such apparatus and it varies directly as the square of the diameter of the aperture. Referring to the second factor, it is clear that the light possesses a certain intensity at the diaphragm aperture and this diminishes in proportion to the square of the distance between the lens of the device and the sensitive medium or plate.

By combining these factors a figure is secured, namely, the ratio of the square of the diameter of the aperture to the square of the focal length of the lens, which will express the relative speed of the lens at the different apertures provided by the diaphragm system fitted to the lens, and at the same time this figure will serve as a convenient guide to the exposures required with the different apertures.

The most generally used method of "stop" marking is the "F" system, which is also designated as the "focal aperture" system. According to this method, apertures of varying size are referred to by numbers which directly indicate the relation between the stop diameter to the focal length of the optical device. The series begins with the largest aperture and is so arranged that each succeeding aperture of smaller size requires double the exposure that would be necessary with the preceding larger aperture or half the exposure required with the next following smaller aperture. Thus supposing the largest aperture has a diameter equal to one-quarter of the focal length of the lens, it is marked F—4. In this manner is obtained a series of diaphragm apertures arranged as follows: F—4, 5.6, 8, 11.3, 16, etc., in which the exposure is doubled with each succeeding smaller aperture.

The device which has been usually employed for regulating the size of the aperture is an iris diaphragm in which the rotation of a collar bearing a pointer or an index, through an arc of 90°, causes the circular aperture to gradually change from the fully opened condition to the fully closed condition. Due to the relation between the area of the opening to the circumferential movement of the collar, the distance between the relative stop values on the circumferential scale diminishes very rapidly as the stop numbers increase. This lessens the ease of reading the position of the index of the collar upon the scale, in exposure meters of practical dimensions.

In the preferred embodiment of my invention the outer tube 1 carries at one end thereof the eye-piece 2 and the magnifying lens 4 is mounted between washers 3. As shown in Figs. 6 and 8, a part of the wall of tube 1 is slit to provide a spring tongue 5, the end of which is inwardly bent to form a lip which slides in the longitudinal groove 6 of the scale tube 7 which is slidably mounted in tube 1. Groove 6 is shorter than scale tube 7 and it prevents the separation of the tubes 1 and 7. The telescopic movement of tube 7 in tube 1 permits the magnifying lens 4 to be sharply focused with respect to the translucent field member 12, which will be later referred to. The tubes 1 and 7 are held in suitable adjusted position by means of a set screw 20. As shown in Fig. 10, the tube 7 is provided with a longitudinal scale to enable the setting or resetting of tube 1 in the proper position with respect to tube 7.

The end of tube 7 which is adjacent the lens 4 is provided with an opaque disc or mask 9 which has the eccentric window or opening 10.

The inner tube 8 is revolubly mounted within the scale tube 7. In order to prevent tube 8 from being separated from the scale tube 7, and to temporarily stop the revolution of tube 8 within tube 7 at desired points, a spring tongue member 11 is formed by slitting the walls 7 as shown in Fig. 10 and the end of this spring tongue 11 is bent inwardly, forming a hook which is shown in Figs. 14 and 15. The inner tube 8 has a circumferential groove 23 formed at one end thereof, and the end of the spring tongue 11 projects within this groove 23, thus preventing the separation of the inner tube 8 from the scale tube 7. As clearly shown in Fig. 14, openings 24 are provided in the bottom of 23 at suitable intervals so that the end of the spring tongue 11 can enter said openings 24 to temporarily arrest the revolution of the tube 7 at desired points. The corners of the hooked end of the spring tongue 11 are suitably rounded to enable the inner end of the spring tongue 11 to be forced out of the openings 24 into the groove 23 whenever a slight manual effort overcomes the elastic resistance of the spring tongue 11, to permit the turning of tube 8. This detail is clearly shown in Fig. 15. As shown in Fig. 4, a field member 12 is provided behind the mask 9 and the window 10. As shown in Fig. 4, the field member 12 may have a square shape divided into four sections, two of which are opaque, the other two being permeable to light. The white area shown in Fig. 4 indicates a field section which is substantially translucent and the shaded section indicates a field which is less translucent or light-permeable.

I do not wish to limit my invention to the shape or size of the field member or to the number of sections thereof which are permeable to light. The field sections may be unmarked or they may be provided with identifying letters, numerals or symbols or, the respective field sections which are utilized may be relatively opaque and may be provided with identifying letters N which have different translucencies so that the respective letters N will become visible when the proper amount of light is passed through their respective sections. The field member 12 is mounted in a disc-like frame which closes the end of the inner tube 8.

By turning the inner tube 8 either one of the field sections may be brought before the opening 10 of the member 9, which closes the end of the scale tube 7. When the inner tube 8 is turned, the inner end of the spring tongue 11 will either slide in the groove 23 or will snap into one of the suitably spaced openings 24, as shown in Figs. 14 and 15, whenever the center of a field section and the letter thereon reaches a position in front of window 10. As shown in Fig. 1, a device is provided for controlling the area of the light admitting aperture which may be the iris diaphragm 13 which is more clearly shown in Fig. 5. This iris diaphragm is actuated by the collar 14 which is provided with an index or pointer 15 as shown in Figs. 6, 8 and 11.

The index 15 moves along a circumferential scale 19 of relative stop values. Said scale 19 comprises a band which is mounted on the tube 8 and surrounds the same save for the part thereof which forms the spring tongue 11, as illustrated in Fig. 10. The index 15 will move along an arc of 90° of the scale 19 when the collar 14 is manipulated to actuate the iris diaphragm so as to vary the size of the aperture thereof from the maximum to the minimum, in which latter position the said diaphragm is almost completely closed.

A diffusion member 16 made of frosted glass or other suitable material is provided in front of the iris diaphragm for preventing the formation of an image when the opening of the said diaphragm is very small, since a pin-hole effect may be produced when said opening is small.

The inner tube 8 is provided with an end 8' which extends beyond the disc 16 and this end 8' is utilized as a mount for computing circumferential scales, as, for example, a stop scale 17, which may be used together with the frequency scale 18.

As shown in Fig. 13, the iris diaphragm controlling the aperture of a camera may be actuated automatically by the movement of the photometer iris diaphragm, if the relative stop value of widest opening is identical on the camera and the photometer. For example, the collars of the iris diaphragms of the camera and of the photometer may have arms 22 connected thereto and these arms may be suitably connected at equal distance from their respective aperture centers, by a link to cause the iris diaphragm of the camera to be moved simultaneously and over the same sector angle with the iris diaphragm of the photometer. Any other suitable connecting means for the iris diaphragm of the camera and of the photometer may be utilized.

The device shown in my U. S. Patent No. 1,587,539 regulated the amount of the admitted light by varying the size of an aperture, and this device also embodied fields of varying light permeability. The said said fields further modified the intensity of the light passing through them so that the said transmitted light corresponded to the actinic effect necessary to properly impress sensitized material of a certain speed if the light were allowed to act upon said material during a time interval associated with the interposed field. This translucent field or the identifying numeral thereon became visible to the observer at the instant when the aperture of the iris diaphragm admitted the amount of light which would cause correct exposure in the camera, if said light acted during the time indicated by said time figure.

The range of relative "F" values is necessarily limited on the upper end of the scale by the dimensions of an instrument of practical size. Thus, large stops would require a very short focal length which would make it necessary to place the translucent field member at such a short distance from the iris diaphragm that the device would be impractical, or else such large stops would require a very large aperture which would make it necessary to make the tubes of inconveniently large size. Nevertheless, the movement of the index of the iris diaphragm and hence the scale of stops is necessarily limited to an arc of 90° so that the smaller aperture values become progressively closer to each other on the scale, which hinders the ease of reading.

The improvements specified herein permit the direct application and measuring of much greater relative stop values without altering the practical dimensions of the device regulating the aperture. Likewise, the "F" values can be shown not only in a scale having an arc of 90° but in a scale having an arc as long as 360°.

In the embodiment shown herein I utilize one-half of the circumference of the device so that the "F" scale is divided into two parts, one extending from as high as f:1.8 to f:8 and the other continuing from f:8 down. Fig. 12 shows a developed view of this scale, the section or subdivision corresponding to the larger apertures being shaded to indicate the use thereof in dim light and the subdivision of the smaller stops being shown in white to indicate its use where sunlight or bright illumination is involved. However, I do not wish to be limited to any particular length of scale or range of stop values. Instead of utilizing a field section whose light permeability would correspond to an exposure time of $\frac{1}{32}$nd of a second when the diaphragm opening is at its maximum (which may correspond to f:4), I have selected for this field a greater light permeability so that the brightness of the light which corresponds to an exposure time of $\frac{1}{32}$nd of a second is indicated at f:1.8. A device of this type is illustrated in Figs. 8 and 9.

The closing of the iris diaphragm to the greatest extent which is practical, by revolving the collar 14 through an arc of approximately 90°, will cause the combination of the aperture and the light permeability of the more permeable field section N to represent an exposure time of $\frac{1}{32}$nd of a second at stop f:8. This position is illustrated in Fig. 8.

I have referred to an exposure time of $\frac{1}{32}$nd of a second because this is the ordinary exposure time employed in motion picture cameras in which sixteen exposures are made per second, the shutter having an opening of about 180°. This is usually designated as the "normal" frequency of a motion picture camera. When the smallest diaphragm opening f:8 has been secured and motion continues, then member 11 is lifted from opening 24 into groove 23 so that the inner tube 8 together with the field member 12 can be moved through an arc of 90° until the end of the spring tongue 11 engages the next notch 24. This causes the replacing of the relatively very permeable field which was associated with the subdivisions f:1.8 to f:8 by the next field which is much less translucent and which is now moved into place behind the opening 10 as shown in Figs. 6 and 7.

The translucency of the second field may be so chosen as to diminish the brightness of the transmitted light by twenty times. Hence, in the second part of the scale the values at the largest diaphragm opening will be $\frac{1}{32}$nd of a second at f:8, instead of being $\frac{1}{32}$nd of a second at f:1.8.

Likewise, when the iris diaphragm has as opening of the smallest practical size, then $\frac{1}{32}$nd of a second will correspond to f:36 in the second part of the scale instead of corresponding to f:8 as in the first part of the scale. After the inner tube 8 has been turned 90° by shifting the end of the spring tongue 11 from one opening 24 to another, the index 15 can now be moved along a new section of the scale 19.

Hence, the entire range of stops now corresponds to one-half the circumference of the instrument, instead of corresponding to only one quarter thereof and the spacing of the consecutive stops in the two subdivisions has been accordingly improved.

It is clear that more than two field sections can be employed with a corresponding number of scale sections.

In order to use the device, collar 14 is turned until index 15 stands at widest opening at the point marked 1.8 on scale 19. The eyecup 2 is placed to the eye, and lens 4 sharply focused upon N in field 12, by telescoping the combined tubes 7 and 8 in tube 1. The set screw 20 will retain the device at proper focus. The instrument is now pointed to the object to be photographed, and the diaphragm 13 closed by manipulating the knurled collar 14 until the letter N disappears.

If the said letter N remains visible when the index 15 is adjacent the marking f:8 as shown in Fig. 8, the collar 14 is turned so as to overcome the slight resistance caused by the spring tongue 11 and the collar 14 is additionally turned until the end of spring tongue 11 snaps into the next notch 24, thus bringing the darker field section behind the window 10 as shown in Fig. 7 and bringing the index 15 to the smallest stop. The diaphragm can now be slowly opened, the collar 14 being held in position when the letter N reappears and becomes just legible. The position of the index 15 with respect to the scale 19 is noted and the stop value which is thus indicated corresponds to that which must be utilized in connection with the camera lens to secure full and correct exposure in motion picture cameras operating at normal speed, or in still cameras having a shutter speed of $\frac{1}{32}$nd of a second.

In order to mechanically compute different frequencies, the mark N on the independently turnable ring 18 is placed opposite the stop number on ring 17 which corresponds to the scale number originally pointed out. Likewise the scale on ring 18 could be of any suitable type to designate the speed of the sensitive material used, or to make any other suitable comparison for the purposes of photography.

If the photometer is connected with a camera having a lens of the same extreme speed value as the photometer as shown in Fig. 13, it will suffice to manipulate the photometer to cause the letter N to reappear, and this will cause the camera to be automatically and simultaneously provided with the proper lens aperture for correct exposure.

I have shown a preferred embodiment of my invention, but it is clear that numerous changes and omissions could be made without departing from its spirit.

I claim:

1. An exposure meter or the like, having an enlarged range and scale of directly ascertainable stop values, comprising movable means adapted to regulate the intensity of light admitted into the device, a plurality of movable field sections of different translucency, each of said translucencies corresponding to a specific series of stop values said scale being associated with said field sections and having separate scale portions respectively corresponding to said field members, whereby the length of said scale exceeds the normally available length corresponding to the normal movement of said light-regulating means.

2. An exposure meter or the like having movable means adapted to control the admission of a beam of light into the device, a plurality of movable field sections each of which is adapted to respectively receive that portion of said beam of light which enters the device, and a scale of directly ascertainable stop values associated with said movable means, said scale having separate portions to indicate the position of said movable means, each said scale portion corresponding to a different field section.

3. An exposure meter or the like having an iris diaphragm associated with a tube, a movable collar adapted to actuate said diaphragm, said tube having associated therewith a plurality of movable field sections of different translucencies each of which can be placed in alignment with a beam of light passing through said diaphragm, and an enlarged scale of directly ascertainable stop values associated with said collar, said scale having portions each of which corresponds to the movement of said collar for controlling said beam of light when different field sections are utilized.

4. A device according to claim 3 in which said collar has a limited free movement, and in which said collar and said field sections have connecting means adapted to automatically shift said field sections when said collar exceeds its normal free movement.

5. An exposure meter for indicating the stop value corresponding to a sensitive material having a definite exposure speed and intended to be exposed for a fixed period, comprising movable means adapted to control the admission of light into the device, translucent field sections having translucencies above and below the translucency adapted to render said fields visible when they receive maximum illumination in the device, and a scale of directly ascertainable stop values associated with said movable means, said scale having portions corresponding to the movement of said light regulating means when different fields are utilized.

6. In a photometer or the like having an extended range and scale of directly ascertainable stop values, the combination of movable means adapted to regulate the intensity of admitted light by control of an aperture area of the device, said movable means having an index adapted to indicate on said scale of relative stop values the selective aperture conditions, a movable field member comprising a plurality of translucent fields of different light permeability corresponding to a specific exposure time, the translucency of each individual field corresponding to a section of relative stop values of said scale, connecting means intermediate said field member and said scale, and adapted to expose selectively the fields of said field member at separate predetermined points of the full range of movement of said movable means, so that said movement of the movable means will be indicated along that part of said scale corresponding to the relative stop values represented by the selected fields.

In testimony whereof I affix my signature.

EMIL MAYER.